("12) United States Patent
Yang et al.

(10) Patent No.: US 10,735,898 B2
(45) Date of Patent: Aug. 4, 2020

(54) DEVICE FOR DETERMINING LOCATION OF TERMINAL

(71) Applicant: DOOSAN HEAVY INDUSTRIES & CONSTRUCTION CO., LTD., Changwon-si, Gyeongsangnam-do (KR)

(72) Inventors: Seong Yeol Yang, Yongin-si (KR); Young Hoon Seo, Suwon-si (KR); Seung Take Oh, Daejeon (KR); Seock Moon Yoon, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/265,924

(22) Filed: Feb. 1, 2019

(65) Prior Publication Data
US 2019/0281412 A1    Sep. 12, 2019

(30) Foreign Application Priority Data
Mar. 12, 2018  (KR) .......................... 10-2018-0028696

(51) Int. Cl.
H04W 4/00     (2018.01)
H04W 4/02     (2018.01)
(Continued)

(52) U.S. Cl.
CPC ........... H04W 4/023 (2013.01); G01S 5/0294 (2013.01); G01S 19/25 (2013.01); H04W 4/029 (2018.02); H04W 64/003 (2013.01)

(58) Field of Classification Search
CPC ................................. G01S 1/02; H04W 4/029
(Continued)

(56) References Cited

U.S. PATENT DOCUMENTS

2014/0106782 A1*  4/2014  Chitre ................. H04W 4/90
                                                455/456.2
2014/0236476 A1   8/2014  Khorashadi et al.
(Continued)

FOREIGN PATENT DOCUMENTS

KR    20110035983 A    4/2011
KR    20150137805 A   12/2015
(Continued)

OTHER PUBLICATIONS

A Korean Office Action dated Oct. 11, 2019 in connection with Korean Patent Application No. 10-2018-0028696 which corresponds to the above-referenced U.S. application.
(Continued)

Primary Examiner — Kiet M Doan
(74) Attorney, Agent, or Firm — INVENSTONE Patent, LLC

(57) ABSTRACT

A device and method determine a location of a terminal by selecting one of a GPS signal and a beacon signal when a terminal moves indoors and outdoors. The device includes a measurement unit for measuring a signal strength of a GPS signal and a signal strength of a beacon signal, respectively; a selection unit for comparing the measured signal strengths and selecting one signal of the GPS signal and the beacon signal based on the comparison; and a determination unit for determining the location of the terminal using the selected signal. The selection unit compares the measured signal strengths based on at least one of a received signal strength indicator (RSSI) and a signal-to-noise ratio (SNR) to select a signal having a comparatively stronger strength, and selects a signal whose strength is increasing when the measured signal strengths are substantially equal to each other.

14 Claims, 4 Drawing Sheets

(51) Int. Cl.
  *G01S 19/25*   (2010.01)
  *G01S 5/02*    (2010.01)
  *H04W 4/029*   (2018.01)
  *H04W 64/00*   (2009.01)

(58) Field of Classification Search
  USPC ............ 455/456.6, 456.2, 456.1, 435.1, 450,
       455/67.11, 404.2, 436; 370/252, 338,
       370/311, 328; 342/457, 367, 357.31;
       340/870.07, 686.6; 348/552
  See application file for complete search history.

(56) References Cited

U.S. PATENT DOCUMENTS

| | | | |
|---|---|---|---|
| 2016/0154117 A1* | 6/2016 | Baudia | G01S 19/34 |
| | | | 342/357.31 |
| 2018/0067187 A1* | 3/2018 | Oh | H04W 64/00 |
| 2018/0088339 A1* | 3/2018 | Aruga | G01S 19/48 |

FOREIGN PATENT DOCUMENTS

| | | |
|---|---|---|
| KR | 20160007351 A | 1/2016 |
| KR | 20160018891 A | 2/2016 |

OTHER PUBLICATIONS

Seamless indoor/outdoor positioning handover for location-based services in streamspin, 2009.
Hybrid indoor and outdoor location services for new generation mobile terminals, 2014.

\* cited by examiner

[FIG. 1]
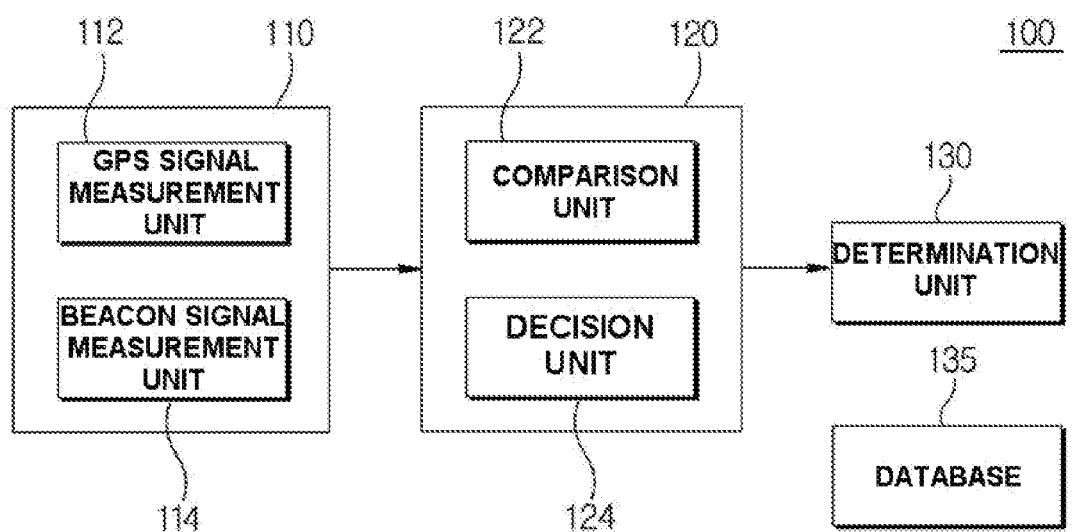

[FIG. 2]
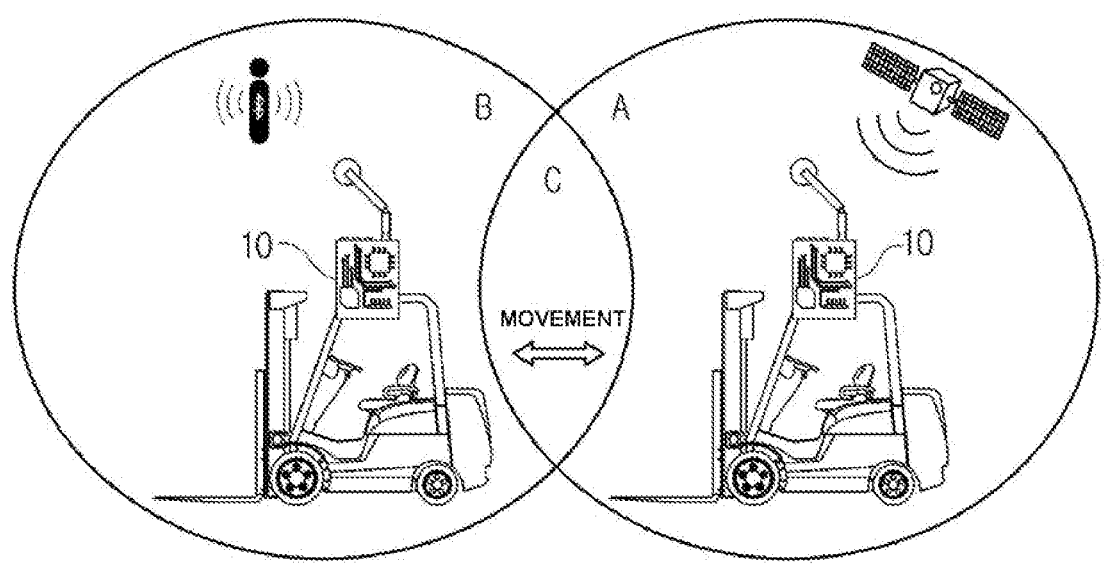

[FIG. 3A]
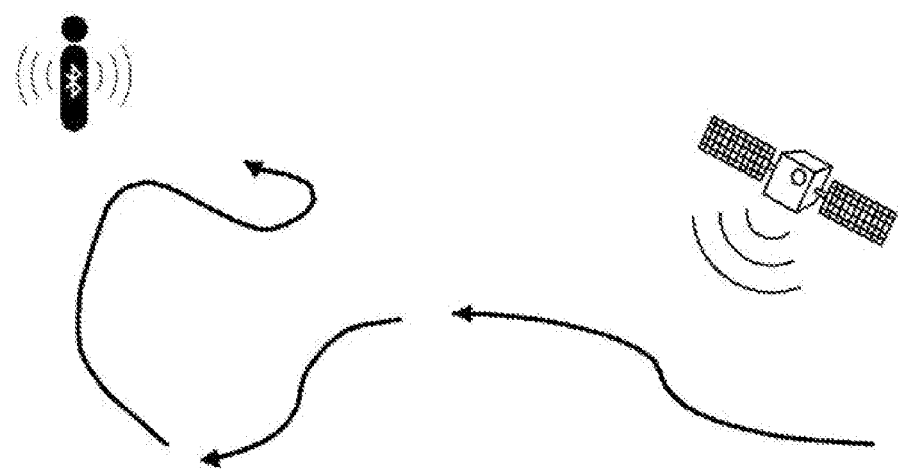

[FIG. 3B]
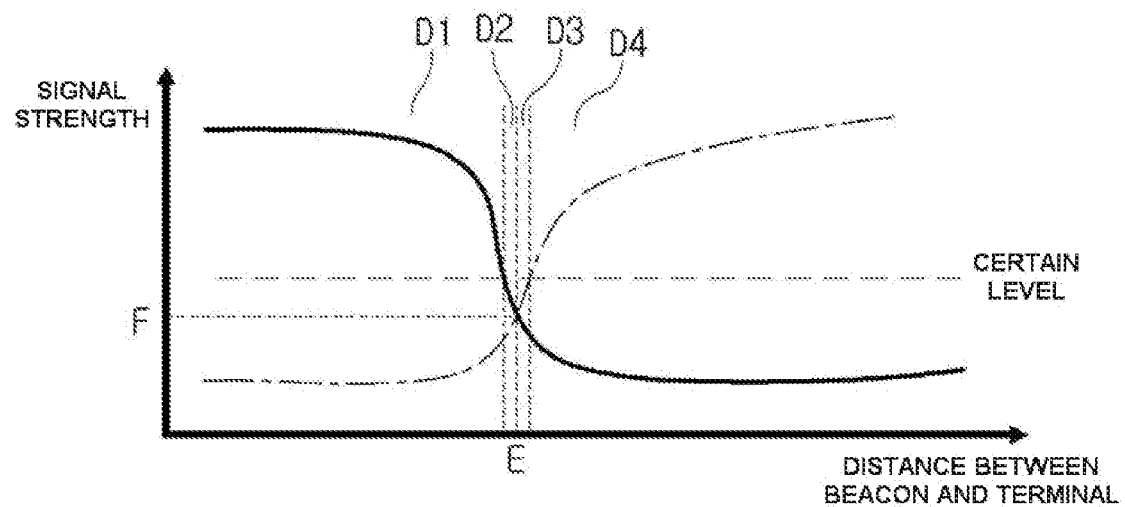

DEVICE FOR DETERMINING LOCATION OF TERMINAL

CROSS-REFERENCE TO RELATED APPLICATIONS

This application claims priority to Korean Patent Application No. 10-2018-0028696, filed on Mar. 12, 2018, the disclosure of which is incorporated herein by reference in its entirety.

BACKGROUND OF THE DISCLOSURE

Field of the Disclosure

The present disclosure relates to a device for determining a location of a terminal, and more particularly, to a device for determining a location of a terminal, which selects one of a GPS signal or a beacon signal when a terminal capable of receiving the GPS signal and the beacon signal moves indoors and outdoors to determine a location of the terminal.

Description of the Related Art

Recently, a global positioning system (GPS) has been used as a location based service that creates added value by combining with a mobile communication terminal such as a smartphone to combine location information and surrounding information of a user. The location based service is used in various fields such as rescue request, a response to a crime report, a geographic information system for providing neighboring area information, traffic information, vehicle navigation, and logistics relation.

Generally, since GPS systems are usable only in areas where a GPS satellite signal may be received, their application is typically limited to outdoor areas. There have been constraints to GPS application in areas where the satellite signal is blocked or impeded, such as indoors. For example, the relatively weak strength of the radio signal transmitted from a GPS satellite proscribes GPS location measurement in the absence of line-of-sight reception, which generally limits GPS usage to the outdoors while precluding indoor usage, that is, in areas such as a building or factory interior.

In address the above problem, installation configurations have been devised in which a signal from a local beacon is received to determine an indoor location. However, the transmission range of the beacon signal is limited, and location may be determined only when a subject terminal is present within a certain range. Terminal location determination is difficult when the terminal is located outdoors where the installation of the beacon is limited or impractical.

SUMMARY OF THE DISCLOSURE

The present disclosure is intended to solve the above-described problems, and an object of the present disclosure is to provide a device for determining a location of a terminal, which selects one of a GPS signal or a beacon signal when a terminal capable of receiving the GPS signal and the beacon signal moves indoors and outdoors to determine a location of the terminal.

Other than the above-described objects of the present disclosure, other features and advantages of the present disclosure will be described hereinafter, or can be clearly understood by those skilled in the art to which the present disclosure pertains from the technology and the descriptions thereof.

Therefore, in accordance with one aspect to the present disclosure, there is provided a device for determining a location of a terminal. The device may include a measurement unit for measuring a signal strength of a GPS signal and a signal strength of a beacon signal, respectively; a selection unit for comparing the measured signal strengths and selecting one signal of the GPS signal and the beacon signal based on the comparison; and a determination unit for determining the location of the terminal using the selected signal.

The selection unit may be configured to compare the measured signal strengths based on at least one of a received signal strength indicator (RSSI) and a signal-to-noise ratio (SNR).

The selection unit may be configured to select a signal having a comparatively stronger strength between the GPS signal and the beacon signal.

The selection unit may be configured to select a signal whose strength is increasing, when the measured signal strengths are substantially equal to each other.

The selection unit may be configured to set a reference range based on a specific distance between the terminal and a beacon transmitting the beacon signal, when the measured signal strengths are substantially equal to each other, and the reference range may be a range in which the selection unit switches the selected signal from one to the other of the GPS signal and the beacon signal.

The selection unit may be configured to set a certain level having the strength value of a signal stronger than a specific strength based on the specific strength when the strength of the GPS signal and the strength of the beacon signal are equally measured.

The selection unit may be further configured to maintain the selected signal when each of the respectively measured strengths of the GPS signal and the beacon signal is greater than or equal to the certain level.

The selection unit may be further configured to select a signal other than the selected signal when the measured strength of the selected signal drops below the certain level.

The selection unit may be configured to select the beacon signal if the terminal moves to within a propagation range of a beacon transmitting the beacon signal.

The selection unit may be configured to select the GPS signal if the terminal is out of a propagation range of a beacon transmitting the beacon signal.

The determination unit may be configured to determine the location of the terminal based on beacon location information that is stored in a database and is indicative of a location of a beacon transmitting the beacon signal.

Meanwhile, in accordance with another aspect of the present disclosure, there is provided a method for determining a location of a terminal. The method may include steps of measuring a signal strength of a GPS signal and a signal strength of a beacon signal, respectively; comparing the measured signal strengths; selecting one signal of the GPS signal and the beacon signal based on the comparing; and determining the location of the terminal using the selected signal.

The device for determining the location of the terminal according to an embodiment of the present disclosure may determine a precise location even if the terminal is located wherever it is indoors or outdoors.

In addition, since the device for determining the location of the terminal measures the strength of the GPS signal and the strength of the beacon signal in real time, it is possible to determine the location of the terminal by switching a signal used as a basis for determining the location of the terminal at an appropriate time point. Accordingly, it is possible to solve the problem that the signal for determining the location of the terminal is not received.

In addition, other features and advantages of the present disclosure may also be newly confirmed through the embodiments of the present disclosure.

BRIEF DESCRIPTION OF THE DRAWINGS

FIG. 1 is a block diagram of a device for determining a location of a terminal according to an embodiment of the present disclosure.

FIG. 2 is a diagram illustrating the selection of a signal according to the strengths of a GPS signal and a beacon signal.

FIG. 3A is a diagram illustrating a movement path of a terminal.

FIG. 3B is a diagram illustrating strengths of the GPS signal and the beacon signal according to the terminal movement shown in FIG. 3A.

DESCRIPTION OF SPECIFIC EMBODIMENTS

Hereinafter, exemplary embodiments of the present disclosure will be described in detail with reference to the accompanying drawings so that those skilled in the art to which the present disclosure pertains may easily practice the present disclosure. The present disclosure may be implemented in various different forms, and is not limited to the exemplary embodiments described herein.

FIG. 1 illustrates a configuration of a device 100 for determining a location of a terminal according to an embodiment of the present disclosure.

Referring to FIG. 1, the terminal location determining device 100 may include a measurement unit 110, a selection unit 120, and a determination unit 130. The device 100 may be provided at an industrial site such as a factory or similar facility at which a beacon is installed and at which GPS satellite signal reception is possible, and the beacon may include one or more Bluetooth-compatible transmitters or similar wireless data devices.

The device 100 is configured to receive both a GPS signal and a beacon signal. Thus, the point of reception of the GPS signal and the point of reception of the beacon signal may be assumed to be the same location. It may be further assumed that respective detection of the two signals is performed simultaneously or substantially simultaneously.

The device 100 may be installed in mobile equipment that moves freely throughout the industrial site, including indoor and outdoor areas. Thus, the device 100 may move together with the movement of the mobile equipment and may respectively receive the GPS signal and the beacon signal in order to determine the location of the mobile equipment. In another example, the device 100 may itself constitute or include the mobile equipment that moves about the industrial site. In either case, the received GPS signal may indicate current location information of the device 100, which information may include latitude and longitude coordinates, while the received beacon signal may indicate a distance between the beacon and the device 100.

According to the present disclosure, the device 100 may be configured so as to be physically unified with the terminal whose location is to be determined. Accordingly, in some instances, references herein to the device 100 and the terminal may be considered interchangeable.

The measurement unit 110 may include a GPS signal measurement unit 112 and a beacon signal measurement unit 114 and may respectively measure the strength (magnitude) of the received GPS signal and strength (magnitude) the received beacon signal. The GPS signal measurement unit 112 may receive the GPS signal using a pre-amplifier, a noise filter, etc., and may measure the strength of the received GPS signal. When the terminal being located by the device 100 receives the beacon signal, reception sensitivity of the received beacon signal may vary according to the distance between the beacon and the terminal and may vary further according to a presence of interceding obstacles to transmission between the beacon and the terminal. Accordingly, the beacon signal measurement unit 114 may measure the signal strength of the beacon signal based on the reception sensitivity of the beacon signal received at the terminal.

The selection unit 120 may compare the respectively measured strengths of the GPS signal and the beacon signal and may select either the GPS signal or the beacon signal according to a comparison result. The selection unit 120 may include a comparison unit 122 and a decision unit 124.

The comparison unit 122 may compare the strength of the GPS signal with the strength of the beacon signal using a received signal strength indicator (RSSI) or a signal-to-noise ratio (SNR). The RSSI includes a value for determining the strength of either of the received beacon signal or the received GPS signal and is based on a strength (power) loss or a path loss of a signal between the terminal and the beacon or between the terminal and the GPS satellite.

That is, the strength of the beacon signal or the GPS signal may be measured according to the following equation to determine an RSSI value.

$$\text{RSSI} = -10n \log d + \text{TxPower}$$

Here, n denotes propagation loss, d denotes a distance between transmitter (i.e., satellite or beacon) and receiver (i.e., the device 100), and TxPower denotes the magnitude of a transmission signal.

Since wireless communication technology adopts architecture capable of using an RSSI telegram, and a structure of an RSSI-compatible device is known, the comparison unit 122 may measure the strength of the beacon signal and the strength of the GPS signal through the RSSI.

In addition, the SNR value is a ratio of a signal to noise, which means the strength of a signal versus a noise floor, and when the ratio drops, a signal may be lost in the noise. The strength of a received signal may be measured by using its SNR value, which may be determined by the following equation.

$$SNR = \frac{P_{signal}}{P_{noise}}$$

Here, $P_{signal}$ denotes the power of a transmission signal, and $P_{noise}$ denotes the power of noise.

The comparison unit 122 may measure the respective strengths of the GPS signal and the strength of the beacon signal using the RSSI or the SNR according to the above equations, and may numerically compare the measured strength of the GPS signal and the measured strength of the beacon signal.

The decision unit 124 may select the signal having the comparatively stronger strength between the GPS signal and the beacon signal. When the terminal being located by the device 100 is located at a point where only the GPS signal is received, the terminal may receive only the GPS signal, at which time the decision unit 124 may select the GPS signal, which is the stronger signal of the GPS signal and the beacon signal. In addition, when the terminal is located at a point where only the beacon signal is received, the terminal may receive only the beacon signal, at which time the decision unit 124 may select the beacon signal, which is the stronger signal of the GPS signal and the beacon signal.

When the signal strengths of the GPS signal and the beacon signal are equal or substantially equal, the decision unit 124 may select the signal whose strength is increasing. For example, in a scenario in which the GPS signal is received only or primarily outdoors (e.g., outside the installation site) and the beacon signal is received only or primarily indoors (e.g., inside an installation site), the strength of the GPS signal may gradually weaken and the strength of the beacon signal may gradually strengthen as the terminal moves from the outside to the inside. In this case, the decision unit 124 may select the beacon signal, that is, select the strengthening beacon signal over the weakening GPS signal. At this time, the decision unit 124 may select the beacon signal when the strengths of two signals are equal, since the beacon signal strength will become greater than the GPS signal strength as the terminal moves farther from the point where the two signal strengths were equal, that is, toward the beacon. The decision unit 124 may select the beacon signal by switching from the GPS signal to the beacon signal at the point where the two signal strengths became equal. Accordingly, it is possible to solve the problem in that a signal for determining the location of a terminal is not received. That is, the device 100 may determine the location of a terminal without interrupting the signal.

In addition, the decision unit 124 may set a reference range based on a specific distance between the terminal and the beacon when the strength of the GPS signal and the strength of the beacon signal are equally measured. The reference range is a parameter relating to the distance between the terminal and the beacon and may be a range (a span of varying distances) in which the signal selected by the device 100 switches from one to the other of the GPS signal and the beacon signal. Specifically, the decision unit 124 may set the reference range to correspond to a sectional area of the installation site where, for a specific beacon-to-terminal distance when the respectively measured signal strengths are equal, the terminal is located within a certain distance (e.g., 2 m) from the specific distance (e.g., 50 m). That is, if it is assumed that the strengths of the GPS signal and the beacon signal are the same at a specific distance of, say, 50 m from the beacon to the terminal, the reference range may be set as the distance (e.g., ±2 m) from a 48 m terminal-to-beacon distance to a 52 m terminal-to-beacon distance. In this example, the difference with respect to (or certain distance from) the specific beacon-to-terminal distance would be 2 m. The decision unit 124 may switch the selected signal at any point within the reference range, thus determining the location of the terminal without interruption.

In addition, the decision unit 124 may set as a certain level the strength value of the signal that is stronger than a specific strength determined when the strength of the GPS signal and the strength of the beacon signal are equally measured relatively. The certain level is a parameter relating to the relative strengths of the GPS signal and the beacon signal. When each of the respectively measured strengths of the GPS and beacon signals is greater than or equal to (i.e., not less than) the certain level, the decision unit 124 may sufficiently determine the terminal location using the previously selected signal. That is, the decision unit 124 may maintain the selection of the signal and may continue using the previously selected signal, in an uninterrupted manner, without switching the selected signal. On the other hand, when the strength of the selected signal is less than the certain level, the decision unit 124 may perform a signal selection whereby the selected signal is switched to the other of the GPS signal and the beacon signal. For example, when the decision unit 124 has selected the GPS signal so that the determination unit 130 determines the terminal location using the GPS signal, the strength of the GPS signal may drop below the certain level due to changes in environmental conditions other than movement of the terminal, in which case the decision unit 124 may select the beacon signal (i.e., switch the signal selection) so that the terminal location determination may continue without interruption. As another example, when the decision unit 124 has selected the beacon signal so that the determination unit 130 determines the terminal location using the beacon signal, the strength of the beacon signal may drop below the certain level due to changes in environmental conditions other than movement of the terminal, in which case the decision unit 124 may select the GPS signal (i.e., switch the signal selection) so that the terminal location determination may continue without interruption.

In addition, the decision unit 124 may select the beacon signal when the terminal moves to within the reception range of the beacon signal, and may receive the GPS signal when the terminal is out of the propagation range of the beacon.

The determination unit 130 may determine the location of the terminal using the signal selected by the selection unit 120. In the case of GPS signal reception, it is possible to indicate latitude and longitude coordinates and to display the corresponding location on a map, thus displaying a precise location of the terminal. The beacon signal, on the other hand, may only indicate a distance between the terminal and the beacon, and it is not possible to know in which direction the distance is based on. Therefore, as shown in FIG. 1, the device 100 may utilize a database 135.

The database 135 may be included in the beacon and may store the location of each of a plurality of beacons installed at the site. The determination unit 130 may reference the database 135 to determine the location of the beacon, which is installed a distance away from the terminal, that is, the distance between the terminal and the beacon. The determination unit 130 may then determine an accurate location of the terminal using the thus determined location of the beacon.

According to an embodiment of the present disclosure, it is possible to determine a precise location of a terminal, regardless of where (indoors or outdoors) the terminal is located. In addition, it is possible to switch between the GPS signal or the beacon signal at an appropriate point in time, thus determining the location of the terminal without interruption.

FIG. 2 illustrates the selection of a signal according to the strengths of a GPS signal and a beacon signal.

Referring to FIGS. 1 and 2, a terminal 10 may be attached to equipment moving indoors, moving outdoors, or moving between indoor and outdoor areas. The terminal 10 may move together with the movement of the equipment, or the terminal 10 may be embodied as the equipment that moves. The terminal 10 may receive the GPS signal and the beacon signal, and the strengths of the GPS signal and the beacon signal received by the terminal 10 may vary according to the movement of the terminal 10. In receiving the GPS signal, a reception range A of the GPS signal may be predetermined; and in receiving the beacon signal, a reception range B of the beacon signal may be predetermined. That is, the selection unit 120 may select the GPS signal within the reception range A of the GPS signal and may select the beacon signal within the reception range B of the beacon signal. At this time, a reception area C where the reception ranges of the GPS signal and the beacon signal overlap may occur. The selection unit 120 may select either the GPS signal or the beacon signal in the reception area C, by comparing the GPS signal strength and the beacon signal strength. The selection unit 120 may numerically compare the strength of the GPS signal and the strength of the beacon signal using the RSSI or the SNR.

When the terminal 10 is located within the range A where only the GPS signal is received (i.e., range A excluding area C), the selection unit 120 may select the GPS signal so that the determination unit 130 determines the location of the terminal 10 through the GPS signal. When the terminal 10 is located within the range B where only the beacon signal is received (i.e., range B excluding area C), the selection unit 120 may select the beacon signal so that the determination unit 130 determines the location of the terminal 10 through the beacon signal.

When the terminal 10 is located within the area C where both the GPS signal and the beacon signal are received, the selection unit 120 may select the stronger signal between the GPS signal and the beacon signal. At this time, in the event that the strength of the signal selected by the selection unit 120 weakens and drops below a certain level, the selection unit 120 may select a signal other than the currently selected signal. That is, when the strength of the signal currently selected by the selection unit 120 drops below the certain level and the strength of the other signal is also below the certain level, the selection unit 120 may select a signal that is increasing in strength. In this case, the selection unit 120 may select the signal whose strength is increasing based on a specific location at which the strength of the GPS signal and the strength of the beacon signal become the same while the terminal 10 moves. At this time, the selection unit 120 may set as a reference range, spanning from a point before moving by a certain distance to a point after moving by the certain distance, based on the specific location when the respectively measured signal strengths are equal, and may switch the selected signal within the reference range.

In addition, when the strength of each of the GPS signal and the beacon signal is greater than or equal to (i.e., not less than) the certain level, the selection unit 120 may select a stronger signal of the two signals without changing. That is, the selection unit 120 may maintain the selected signal and continue to use the previously selected signal. As a result, it is possible to prevent repetitious switching, over a short time, between the signals (GPS signal and beacon signal) for determining the location of the terminal 10 by the selection unit 120. That is, as the location of the terminal 10 may be sufficiently determined regardless of changing the selected signal, the signal used as a basis for determining the location of the terminal 10 may be prevented from being changed.

FIGS. 3A and 3B illustrate a change in a signal according to the movement of a terminal, where FIG. 3A illustrates the movement path of the terminal and FIG. 3B illustrates the strengths of the GPS signal and the beacon signal according to the terminal movement shown in FIG. 3A. In FIG. 3B, the solid plot line indicates the beacon signal strength, and the interrupted (dotted) plot line indicates the GPS signal strength.

Referring to FIGS. 2 and 3A, the terminal 10 is moving from within the reception range A of the GPS signal to within the reception range B of the beacon signal. As the terminal 10 moves, the GPS signal strength may be expected to diminish (weaken), and the strength of the beacon signal strength may be expected to grow (strengthen).

Referring to FIGS. 2 and 3B, a distance E may indicate a specific distance between the terminal and the beacon, and a level F may indicate a specific level of signal strength. That is, when the respectively measured strengths of the GPS and beacon signals are equal, the distance E may be the specific beacon-to-terminal distance, and the level F may be the specific strength. The selection unit 120 may set the reference range based on the specific distance E, and the terminal 10 may set as a reference range D2~D3 a sectional area where the distance between the terminal and the beacon is different by a certain distance based on the specific distance E. In addition, the selection unit 120 may set a certain level based on the specific strength F, and may set as the certain level the strength value of a signal stronger than the specific strength F.

D1 may indicate a beacon-to-terminal distance at which the strength of the signal provides for the terminal 10 to be located within the reception range B of the beacon signal. Since the beacon signal strength is greater than or equal to the certain level and the GPS signal strength is less than or equal to the certain level in the range D1, the selection unit 120 may select the beacon signal.

D2 and D3 may indicate beacon-to-terminal distances at which the strength of the signal provides for the terminal 10 to be located within the area C where the reception range B of the beacon signal overlaps the reception range A of the GPS signal. Thus, the combined distance of D2 and D3 represent a handover region. Since the GPS signal strength and the beacon signal strength are both less than the certain level in the range D2, the selection unit 120 may select the GPS signal. Since the GPS signal strength and the beacon signal strength are both less than the certain level in the range D3, the selection unit 120 may maintain selection of the GPS signal. That is, the selection unit 120 may not select the beacon signal and may continuously use the selected GPS signal.

D4 may indicate a beacon-to-terminal distance at which the strength of the signal provides for the terminal 10 to be located within the reception range A of the GPS signal. Since the GPS signal strength is greater than or equal to the certain level and the beacon signal strength is less than or equal to the certain level in the range D4, the selection unit 120 may maintain the selected GPS signal without changing. That is, the selection unit 120 may continuously use the selected GPS signal.

According to an embodiment of the present disclosure, it is possible to achieve the device for determining the location of the terminal, which selects one of the GPS signal or the beacon signal when the terminal capable of receiving the GPS signal and the beacon signal moves indoors and outdoors to determine the location of the terminal.

Those skilled in the art to which the present disclosure pertains will understand that the present disclosure may be implemented in other various forms without departing from the technical spirit or essential characteristics of the present disclosure, so the aforementioned embodiments are illustrative in all respects and should not be construed as being limitative. The scope of the present disclosure is disclosed in the following claims rather than the detailed description, and it should be understood that all modifications or variations derived from the meanings and scope of the appended claims and equivalents thereof are included in scope of the present disclosure.

What is claimed is:

1. A device for determining a location of a terminal, the device comprising:
   a measurement unit for measuring a signal strength of a GPS signal and a signal strength of a beacon signal, respectively, the GPS signal and the beacon signal being detected simultaneously and having a same point of reception as each other;
   a selection unit for comparing the measured signal strength of the GPS signal and the measured signal strength of the beacon signal and for selecting one signal of the GPS signal and the beacon signal based on the comparison; and
   a determination unit for determining the location of the terminal using the signal selected by the selection unit,
   wherein the selection unit is configured to set a reference range based on a specific distance between the terminal and a beacon transmitting the beacon signal, when the measured signal strengths are substantially equal to each other, the reference range being a range in which the selection unit switches the selected signal from one to the other of the GPS signal and the beacon signal.

2. The device of claim 1, wherein the selection unit is configured to compare the measured signal strengths based on at least one of a received signal strength indicator (RSSI) and a signal-to-noise ratio (SNR).

3. The device of claim 1, wherein the selection unit is configured to select a signal having a comparatively stronger strength between the GPS signal and the beacon signal.

4. The device of claim 1, wherein the selection unit is configured to select a signal whose strength is increasing, when the measured signal strengths are substantially equal to each other.

5. The device of claim 1, wherein the selection unit is configured to set a certain level having the strength value of a signal stronger than a specific strength based on the specific strength when the strength of the GPS signal and the strength of the beacon signal are equally measured.

6. The device of claim 5, wherein the selection unit is further configured to select a signal other than the selected signal when the measured strength of the selected signal drops below the certain level.

7. The device of claim 5, wherein the selection unit is further configured to maintain the selected signal when each of the respectively measured strengths of the GPS signal and the beacon signal is greater than or equal to the certain level.

8. The device of claim 1, wherein the selection unit is configured to select the beacon signal if the terminal moves to within a propagation range of a beacon transmitting the beacon signal.

9. The device of claim 1, wherein the selection unit is configured to select the GPS signal if the terminal is out of a propagation range of a beacon transmitting the beacon signal.

10. The device of claim 1, wherein the determination unit is configured to determine the location of the terminal based on beacon location information that is stored in a database and is indicative of a location of a beacon transmitting the beacon signal.

11. A method for determining a location of a terminal, the method comprising:
    measuring a signal strength of a GPS signal and a signal strength of a beacon signal, respectively, the GPS signal and the beacon signal being detected simultaneously and having a same point of reception as each other;
    comparing the measured signal strength of the GPS signal and the measured signal strength of the beacon signal;
    selecting one signal of the GPS signal and the beacon signal based on the comparing; and
    determining the location of the terminal using the signal selected by the selecting,
    wherein the selecting comprises setting a reference range based on a specific distance between the terminal and a beacon transmitting the beacon signal, when the measured signal strengths are substantially equal to each other, the reference range being a range in which the selection unit switches the selected signal from one to the other of the GPS signal and the beacon signal.

12. The method of claim 11, wherein the selecting comprises setting a certain level having the strength value of a signal stronger than a specific strength based on the specific strength when the strength of the GPS signal and the strength of the beacon signal are equally measured.

13. The method of claim 12, wherein the selecting further comprises maintaining the selected signal when each of the respectively measured strengths of the GPS signal and the beacon signal is greater than or equal to the certain level.

14. The method of claim 12, wherein the selecting further comprises selecting a signal other than the selected signal when the measured strength of the selected signal drops below the certain level.

* * * * *